United States Patent [19]

Seitz et al.

[11] Patent Number: 4,623,009

[45] Date of Patent: Nov. 18, 1986

[54] COVERING RING FOR A VEHICLE WHEEL

[75] Inventors: Hans Seitz; Udo Frerichs, both of Langenhagen; Heinz-Dieter Rach, Garbsen; Siegmund Spendel, Betheln, all of Fed. Rep. of Germany

[73] Assignee: Continental Gummi-Werke Aktiengesellschaft, Hanover, Fed. Rep. of Germany

[21] Appl. No.: 742,612

[22] Filed: Jun. 7, 1985

Related U.S. Application Data

[62] Division of Ser. No. 540,194, Oct. 7, 1983, Pat. No. 4,563,042.

[30] Foreign Application Priority Data

Oct. 9, 1982 [DE] Fed. Rep. of Germany ....... 3237544

[51] Int. Cl.$^4$ .................. B60B 21/02; B60C 15/02
[52] U.S. Cl. .................. 152/380; 152/381.4; 152/398; 152/DIG. 20
[58] Field of Search ......... 301/6 WB; 152/380, 379.3, 152/381.4, 381.6, 398, DIG. 20

[56] References Cited

U.S. PATENT DOCUMENTS

| 1,777,223 | 9/1930 | Pugh | 152/381.6 X |
| 1,903,575 | 4/1933 | Shoemaker | 152/379.3 X |
| 4,169,496 | 10/1979 | Cataldo | 152/399 X |
| 4,408,647 | 10/1983 | Kuhn et al. | 152/387 X |

FOREIGN PATENT DOCUMENTS

| 2364274 | 6/1975 | Fed. Rep. of Germany | 152/399 |
| 2078638 | 11/1981 | United Kingdom | 301/98 |

Primary Examiner—David A. Scherbel
Attorney, Agent, or Firm—Becker & Becker, Inc.

[57] ABSTRACT

A covering ring for a vehicle wheel. The bead seating surfaces of a tire are mounted on the radially inner periphery of the rim. In order to prevent dirt and/or water from entering the space between the tire bead and the rim well, the covering ring has a width which covers the space between the tire bead, that portion of the rim which extends axially outwardly from the rim well, and the rim well. Also provision is made that the radially inner surface of the covering ring, when viewed in the transverse direction, extends horizontally or is laterally inclined toward the outside. Also provision is made that the radially inner diameter of the covering ring at no point of the space, which is to be covered, be greater than the radially inner diameter of the mounted tire in the bead region.

4 Claims, 9 Drawing Figures

COVERING RING FOR A VEHICLE WHEEL

This is a continuing/divisional application based on co-pending U.S. parent application Ser. No. 540,194—Seitz filed Oct. 7, 1983, now U.S. Pat. No. 4,563,042—Seitz issued Jan. 7, 1986.

BACKGROUND OF THE INVENTION

1. Field of the Invention

The present invention relates to a covering ring for a vehicle wheel on which is mounted a pneumatic tire which is provided with a belt and with pull resistant and compression resistant cores in the beads; the wheel has a rigid rim which is provided with radially inwardly extending rim flanges and, next to the rim flanges, on the inner periphery of the rim, seating surfaces for receiving the belted tire; furthermore, on the inner periphery between the seating surfaces and the rim well, recessed portions are disposed, the average diameter of which is greater than the average diameter of the seating surfaces.

2. Description of the Prior Art

The problem with this type of vehicle wheels is that in the vertical position on a vehicle, dirt and rainwater can collect in the space between each tire bead and the rim well and is prevented from draining off by the higher tire bead.

An object of the present invention is reliably to prevent the accumulation of dirt and water in the endangered region of a vehicle wheel of the aforementioned general type.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
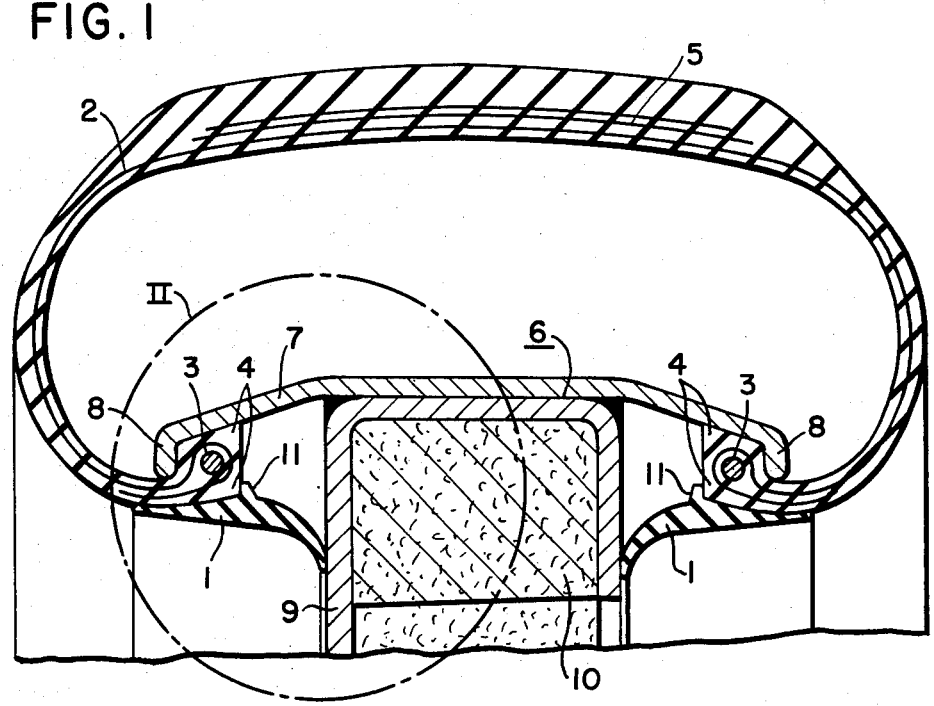
FIG. 1 is a radial partial section of a vehicle wheel showing two inventive covering rings mounted thereon, each of which is provided with a circumferential projection.

The covering ring of the present invention is characterized primarily in that it has a width which covers the space between the tire bead, the rim portion extending axially outwardly from the rim well, and the rim well. The radially inner surface of the cover ring, when viewed in the transverse direction, extends horizontally or laterally at an incline toward the outside. The radially inner diameter of the covering ring is, at no point of the space which is to be covered, greater than the radially inner diameter of the mounted tire in the bead region.

The inventive covering ring, which assures a reliable protection for the endangered region, offers the advantage of an easy installation and removal.

Pursuant to one preferred embodiment of the present invention, the axial edge regions of the covering ring are elastically deformable. In the non-installed state, these regions of the covering ring have a shape, which after installation thereof results in a pressing against the rim well and the tire bead due to inherent forces. The ring can comprise a basically nonflammable material, such as a synthetic material or also metal; if the ring is made of metal, the edges can be provided with synthetic material in order to prevent rattling noises.

The radially outer side of the covering ring may be provided with a circumferential projection for support on the tire bead.

Pursuant to a further preferred embodiment of the present invention, uniformly spaced apart cams are placed on the outer periphery of the covering ring; these cams mesh in corresponding recesses of the tire bead. In the circumferential direction of the covering ring, the latter may be provided with a non-uniform mass distribution, or with additional blocks which are distributed over the radially outer periphery and which can be easily removed by means of safety or breaking planes. These additional blocks also can be in the form of excessively wide cams. The advantage of these measures is that the covering ring can serve simultaneously as a balancing means.

Pursuant to a further specific embodiment of the present invention, the covering ring may comprise hard foam material which fills the space between the tire bead, the rim portion which extends axially outwardly from the rim well, and the rim well. To simplify installation and removal, the ring of hard foam material can be segmented. Such a ring of hard foam material offers the additional advantage of securing the tire bead against being lifted off from the rim seating surface.

Pursuant to still another specific embodiment of the present invention, a ring of hard foam material may be provided with an ornamental ring on the radially inner side thereof. This ornamental ring can serve simultaneously as a mold during the production of the ring of hard foam material. Furthermore, the ornamental ring can be provided with fasteners for receiving balancing weights.

Pursuant to a further specific embodiment of the present invention, the ring of hard foam material may be replaced by a spring ring having an ornamental ring fastened thereon.

DESCRIPTION OF PREFERRED EMBODIMENTS

Referring now to the drawings in detail, FIG. 1 illustrates a vehicle wheel with a convering ring 1 in the mounted state. A belted tire having a radial carcass 2 and a customary belt 5 is mounted on a rim 6. The ends of the radial carcass 2 are anchored in the beads 4 by being looped around the bead cores 3. The tire is mounted on the rim 6 so that the bead seating surfaces are disposed on the rim 6 next to the radially inwardly extending rim flanges 8 on seating surfaces which are disposed on the radially inner side of that portion 7 of the rim 6 which extends axially outwardly from the rim well 9. This rim portion 7 is connected to the rim well 9, the radially outer portion of which has a U-shaped cross section. To prevent dirt and rainwater from entering this U-shaped region, the latter is filled with a ring 10 of foam material.

To cover those spaces which are located axially outwardly of and next to the U-legs of the rim well 9, and which are further delimited by the rim portion 7 and the tire beads 4, two equal covering rings 1 are provided. With rims where the wells do not have a U-shape and are not centrally located on the rim, covering rings of different sizes are installed. If a non-U-shaped well is centrally located on the rim, covering rings of the same size are used, but they have a greater width than that provided for the covering rings 1 shown in FIG. 1.

Figure 2:
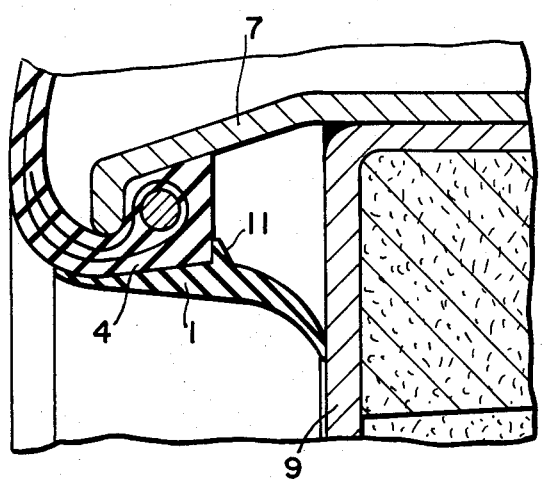
FIG. 2 is an enlarged view of the encircled portion II of FIG. 1 in the region of one of the covering rings.

FIG. 2 illustrates an enlargement of the encircled portion of FIG. 1 in the region of one of the covering rings 1. The axial edge regions of the ring 1 are tapered and with inherent pressure respectively engage the rim well 9 and the tire bead 4, so that these edge regions assume the function of sealing lips. A circumferential projection 11 is located on that side of the ring 1 which faces the rim portion 7. With this projection 11, the covering ring 1 catches behind the tire bead 4. The radially inner surface of the covering ring 1 extends, when viewed in the transverse direction (also designated within the framework of this application as the axial direction), horizontally or better still laterally inclined toward the outside, so that rain and splashed water can run off toward the outside. An accumulation of dirt is also reliably prevented.

The elastically deformable covering ring 1 can comprise a basically nonflammable synthetic material, or also a metal. In either case, one must be assured that the temperatures which occur at the rim well 9 as a consequence of frequent braking are endured. If metal rings are used there may be expedient to provide the edges thereof with synthetic material in order to prevent rattling noises.

Figure 4:
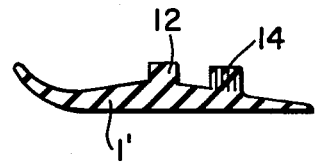
FIG. 4 shows the covering ring of FIG. 3 in the non-mounted state and with additional blocks.
Figure 3:
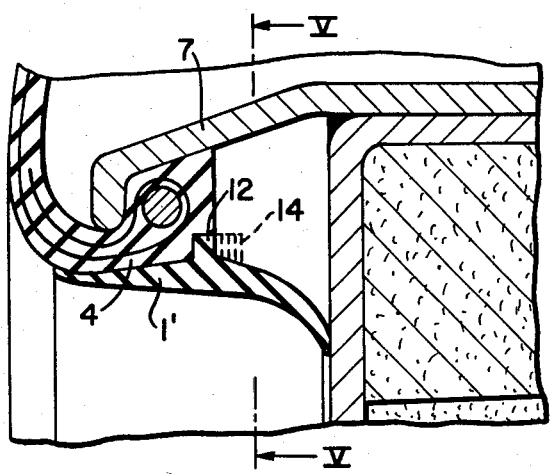
FIG. 3 is a radial partial section showing a portion of a wheel and tire located relative to the middle of the rim with a second inventive embodiment of a covering ring having an extra-wide cam.
Figure 5:
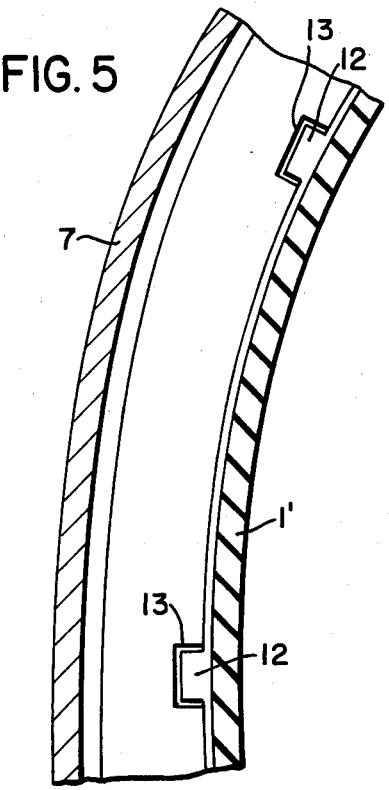
FIG. 5 is a section through the mounted covering ring of FIG. 3 taken along the line V—V thereof.

In place of a single circumferential projection, the covering ring 1' of FIGS. 3, 4, and 5 is provided with individual cams 12 which are uniformly distributed over the outer periphery; the distance between successive cams ranges from 1/12r# to 1/6rπ, where r equals the outer radius of the covering ring. The cams 12 mesh in associated recesses 13 of the tire bead 4, so that the ring 1' is secured against rotation in the circumferential direction. This fixation, in combination with a nonuniform distribution of mass in the circumferential direction, or with additional blocks 14 (FIG. 4) on the radially outer periphery of the covering ring 1', at the same time provides the latter with the function of a balance ring. If additional blocks 14 are provided, there is expedient to provide them with safety or breaking planes and to divide them into a plurality of individual parts, so that "weights" can be removed from a given balance in small units. The additional blocks 14 also can be attached in such a way that the cams 14 which serve for fixation have an excess width (FIG. 3) which can be reduced by the removal of individual "weights".

FIG. 4 shows the covering ring 1' in the unmounted state. Of primary importance is the configuration of the edge regions, which during transition into the mounted state are elastically deformed, so that restoring forces are formed which effect a reliable pressure on the rim well 9 and the tire bead 4.

Figure 6:
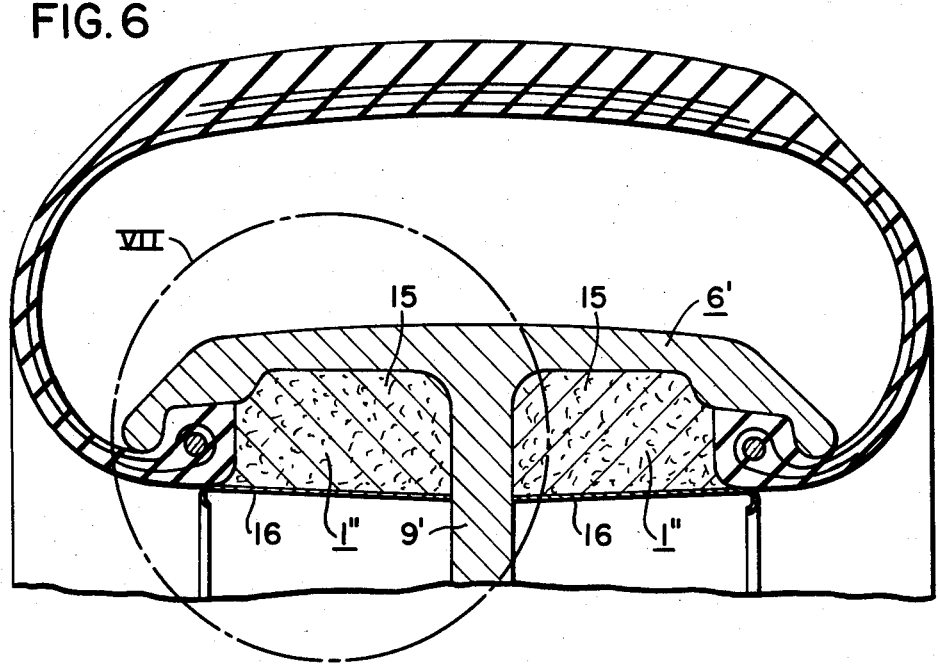
FIG. 6 is a radial partial section showing a vehicle wheel on which there are mounted two further inventive embodiments of a covering ring made of hard foam material and provided with an ornamental ring.
Figure 7:
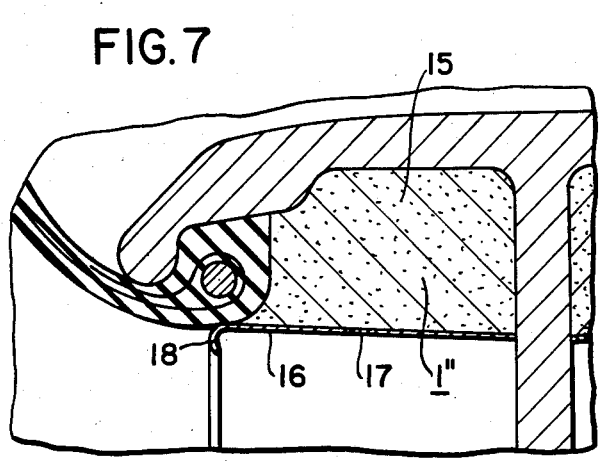
FIG. 7 is an enlarged view of the encircled portion VII in FIG. 6 in the region of one of the covering rings.

FIG. 6 shows a further vehicle wheel with a belted tire and a rim 6' with a centrally disposed rim well 9'; also provided are two covering rings 1" which comprise hard foam material 15 and are provided radially inwardly with a trim or ornamental ring 16. FIG. 7 is an enlarged view of the encircled portion of FIG. 6 in the region of one of the covering rings 1". The ring 16 can serve as a mold for the foaming of the hard foam material 15. For this purpose, the ring should be provided with a plurality of openings 17 which are distributed over the periphery and serve for supply of the foam 15 and for venting. The ring 16 can be fastened to the ring of hard foam material 15 with the aid of plastic dowels or in another manner, and can be provided with fasteners 18 for the attachment of balance weights.

The ring of hard foam material 15 also can be a prefabricated component, for example in the form of individual segments; the ring also can be provided radially inwardly with a decorative surface, so that there is no longer any need for and additional ornamental ring.

The above described covering rings with a ring of hard foam material 15 additionally fulfill a securing function for the tire beads 4 in that they prevent the tire beads 4 from lifting off of the rim seating surfaces.

Figure 8:
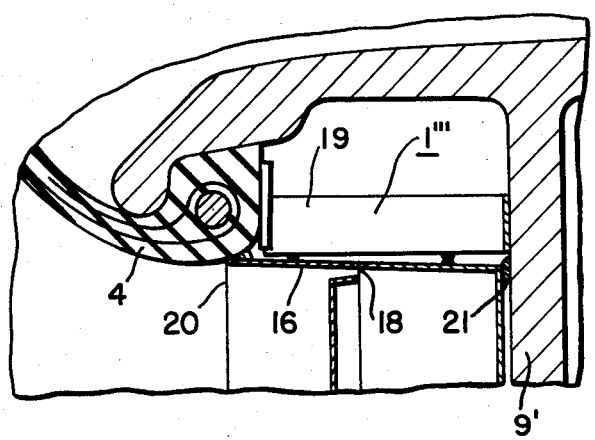
FIG. 8 is a radial partial section showing a portion up to the middle of the rim with a fourth embodiment of a covering ring which comprises a spring ring and an ornamental ring fastened thereon.
Figure 9:
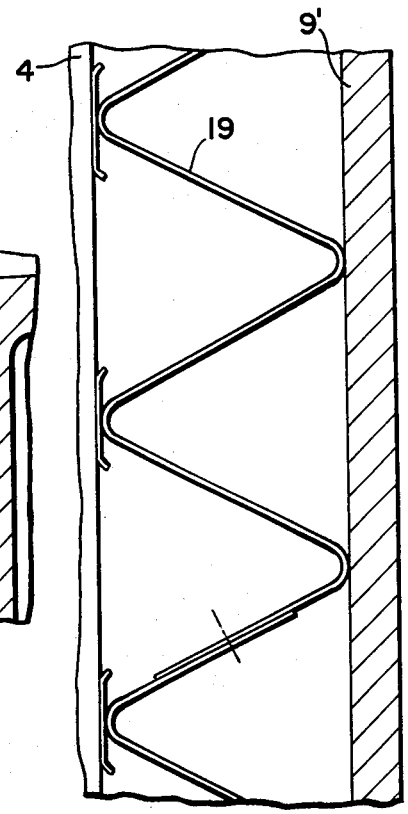
FIG. 9 is a partial plan view showing a portion of the covering ring of FIG. 8.

FIG. 8 shows a radial partial section illustrating a portion up to the middle of the rim with a covering ring 1''' which is formed by a spring ring 19 and an ornamental ring 16 fastened thereon. The circumferential spring ring 19 is clamped in a space between the tire bead 4 and the rim well 9' (FIG. 9), so that it also exercises a supporting effect for the tire bead 4. A circumferential flange is located on the ornamental ring 16 as a fastener 18 for balance weights. The ornamental ring 16 essentially comprises metal, with only edges 20, 21 thereof being provided with plastic or rubber serving as sealing lips.

The present invention is, of course, in no way restricted to the specific disclosure of the specification and drawings, but also encompasses any modifications within the scope of the appended claims.

What we claim is:

1. A covering ring for a vehicle wheel on which is mounted a pneumatic, belted tire having a pull-resistant and compression-resistant cores in the tire beads; said wheel having a rigid rim, radially inwardly extending rim flanges and a rim well, with a respective seating surface for receiving said tire being provided on the radially inner periphery of said rim next to each rim flange; that portion of the radially inner periphery of said rim between each seating surface and the rim well extending in such a way that it has an average diameter which is greater than the average diameter of said seating surfaces;

said covering ring being an annular body which has such a width that in the installed state covers the space between a given tire bead, the rim well, and that portion of said rim which extends axially outwardly from said rim well toward said given tire bead; said covering ring, in the installed state, having a radially inwardly facing surface which, when viewed in the transverse direction, extends in a direction ranging from being horizontal to being outwardly inclined in such a way that the radially inner diameter thereof increases from said rim well in the direction toward the axially outer part of said covering ring; at no point of the space which is to be covered is this radially inner diameter of said covering ring greater than the radially inner diameter of the mounted tire in the bead regions thereof; said covering ring comprising hard foam material and filling said space between a given tire bead, the rim well, and that portion of said rim which extends axially outwardly from said rim well toward said given tire bead, said radially inwardly facing surface of said covering ring being provided with an ornamental ring.

2. A covering ring according to claim 1, in which said ornamental ring comprises metal with only edges thereof being provided with sealing lips made of material taken from a group consisting of plastic, rubber and synthetic material to prevent rattling noises.

3. A covering ring in for a vehicle wheel on which is mounted a pneumatic, belted tire having pull-resistant and compression-resistant cores in the tire beads; said wheel having rigid rim, radially inwardly extending rim flanges and a rim well, with a respective seating surface for receiving said tire being provided on the radially inner periphery of said rim next to each rim flange; that portion of the radially inner periphery of said rim between each seating surface and the rim well extends in such a way that it has an average diameter which is greater than the average diameter of said seating surfaces;

said covering ring being an annular body which has such a width that in the installed state covers the space between a given tire bead, the rim well, and that portion of said rim which extends axially outwardly from said rim well toward said given tire bead; said covering ring comprising hard material and being in the form of a spring ring which is adapted to be clamped in the space between a given tire bead and said rim well; said spring ring having a radially inwardly facing surface, and an ornamental ring fastened thereon.

4. A covering ring according to claim 3, in which said ornamental ring comprises metal with only edges thereof being provided with sealing lips made of material taken from a group consisting of plastic, rubber and synthetic material to prevent rattling noises.

* * * * *